(12) United States Patent
Ward

(10) Patent No.: US 12,163,798 B2
(45) Date of Patent: *Dec. 10, 2024

(54) SYSTEM AND METHOD FOR PROVIDING DIRECTIONS HAPTICALLY

(71) Applicant: Ryan Thomas Ward, Arlington, VA (US)

(72) Inventor: Ryan Thomas Ward, Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/487,081

(22) Filed: Oct. 14, 2023

(65) Prior Publication Data

US 2024/0035839 A1 Feb. 1, 2024

Related U.S. Application Data

(63) Continuation of application No. 17/531,773, filed on Nov. 21, 2021, now Pat. No. 11,808,598, which is a
(Continued)

(51) Int. Cl.
| | |
|---|---|
| *G01C 21/36* | (2006.01) |
| *A45B 25/00* | (2006.01) |
| *A45B 25/14* | (2006.01) |
| *G06F 3/01* | (2006.01) |
| *H04W 4/024* | (2018.01) |

(52) U.S. Cl.
CPC .......... *G01C 21/3652* (2013.01); *A45B 25/00* (2013.01); *A45B 25/14* (2013.01); *A45B 25/143* (2013.01); *G06F 3/016* (2013.01); *H04W 4/024* (2018.02); *A45B 2025/003* (2013.01); *A45B 2200/1018* (2013.01); *A45B 2200/1027* (2013.01); *A45B 2200/1036* (2013.01);
(Continued)

(58) Field of Classification Search
CPC ..... G01C 21/3652; A45B 25/00; A45B 25/14; A45B 25/143; A45B 2025/003; A45B 2200/1018; A45B 2200/1027; A45B 2200/1036; A45B 2200/1045; A45B 2200/1063; G06F 3/016; H04W 4/024
See application file for complete search history.

(56) References Cited

U.S. PATENT DOCUMENTS

| 8,224,376 B1 | 7/2012 | Fujisaki |
|---|---|---|
| 9,494,427 B2 | 11/2016 | Gray |
| (Continued) | | |

OTHER PUBLICATIONS

Griffiths, "Give your bike a sense of direction! £45 smart handlebars vibrate to tell you when to turn and even give traffic alerts", DailyMail.com, Jan. 14, 2015.
(Continued)

*Primary Examiner* — Richard M Camby

(57) ABSTRACT

Systems, methods, and computer-readable storage devices for providing directions haptically such that sight and hearing can continue unimpeded. In one exemplary embodiment, a wearable device (such as earphones, ear rings, gloves, glasses, or other wearable objects) configured as disclosed herein receives directions to an intended destination for a user, the directions comprising a movement action and a distance to the movement action. The wearable device has multiple haptic output units and generates, through one of those units, a haptic output based on the directions. This allows the user to receive the directions through touch rather than looking at their mobile device or from audio.

20 Claims, 8 Drawing Sheets

Related U.S. Application Data continuation of application No. 16/680,500, filed on Nov. 12, 2019, now Pat. No. 11,178,946, which is a continuation of application No. 15/821,835, filed on Nov. 23, 2017, now Pat. No. 10,716,371, which is a continuation of application No. 14/948,286, filed on Nov. 21, 2015, now Pat. No. 9,829,338.

(52) U.S. Cl.
CPC ................ *A45B 2200/1045* (2013.01); *A45B 2200/1063* (2013.01)

(56) References Cited

U.S. PATENT DOCUMENTS

| | | |
|---|---|---|
| 2013/0063268 A1 | 3/2013 | Golomb et al. |
| 2013/0124807 A1* | 5/2013 | Nielsen ............... G06F 11/1482 |
| | | 711/E12.103 |
| 2014/0015662 A1 | 1/2014 | Oettgen |
| 2015/0198455 A1 | 7/2015 | Chen |
| 2015/0338919 A1 | 11/2015 | Weber et al. |
| 2015/0358778 A1 | 12/2015 | Heo |
| 2016/0165965 A1 | 6/2016 | Ellis et al. |
| 2016/0178935 A1 | 6/2016 | Keates |
| 2016/0258758 A1 | 9/2016 | Houston et al. |
| 2017/0108929 A1 | 4/2017 | Sinko et al. |
| 2019/0060736 A1 | 2/2019 | Harris |
| 2019/0107890 A1* | 4/2019 | Yliaho .................. G06F 3/0488 |

OTHER PUBLICATIONS

Hollington, "Getting haptic feedback for walking directions in Google Maps," iLounge.com, Apr. 14, 2015.

Kooser, "Smart shoes vibrate you in the right direction using Google Maps," cnet.com, Jul. 29, 2014.

* cited by examiner

SYSTEM AND METHOD FOR PROVIDING DIRECTIONS HAPTICALLY

PRIORITY

The present application is a continuation of U.S. patent application Ser. No. 17/531,773, filed Nov. 21, 2021, which is a continuation of U.S. patent application Ser. No. 16/680,500, filed Nov. 12, 2019, now U.S. Pat. No. 11,178,946, which is a continuation of U.S. patent application Ser. No. 15/821,835, filed Nov. 23, 2017, now U.S. Pat. No. 10,716,371, which is a continuation of U.S. patent application Ser. No. 14/948,286, filed Nov. 21, 2015, now U.S. Pat. No. 9,829,338, the contents of which are incorporated herein in their entirety.

BACKGROUND

1. Technical Field

The present disclosure relates to navigation and more specifically to providing navigation directions using haptic outputs.

2. Introduction

Traditional navigation has relied on a combination of maps and audible commands. While a large variety of maps are available, looking at a map is inherently distracting from the travel itself. For example, to look at the map the user must either stop (thereby delaying arrival time) or look at the map while continuing to travel (particularly dangerous when driving). Providing of audible commands, particularly via GPS enabled navigation aids, mitigates some of these detriments. However, there are circumstances where an individual needs the capacity to both see and/or hear in an unimpeded capacity, which both maps and auditory commands fail to address.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for providing haptic directions such that sight and hearing can continue unimpeded. In one exemplary embodiment, a system configured as disclosed herein receives directions to an intended destination for a user, the directions comprising a movement action (such as turning or continuing straight) and a distance to the movement action. The directions can be received from a GPS unit (such as a Garmin), a smartphone, a smartwatch, tablet, computer, dashboard navigation service, etc. The directions can be received either individually (i.e., turn left on Main Street in a half mile) or as a list of all remaining directions to the destination. The system generates, via a processor, a left signal component and a right signal component based on the directions. For example, the system can make a left signal component based on the need to turn left and a right signal component based on the need to turn right. Exemplary left and right components can be electrical signals indicating the proximity of a turn. The system transmits the left signal component to a left haptic output unit (a unit which generates haptic output) and transmits the right signal component to a right haptic output unit (another unit which generates haptic output), such that the directions are communicated to the user via the left haptic output unit and the right haptic output unit. Exemplary haptic outputs by the left and right haptic output units can include vibrations, changing surface characteristics, shocks, or other means for tactile communication.

Consider the following example. A motorcycle rider needs to be extremely focused on his surroundings. Using a motorcycle configured as disclosed herein, the rider first pulls up directions to a location using his smartphone (using an App such as Google Maps™ or Apple Maps™). The smartphone links wirelessly (using, for example, a Bluetooth connection) with the motorcycle and communicates the directions to the motorcycle. The motorcycle receives the directions from the phone, then analyzes the directions to determine what signals should be sent to haptic feedback units located in the handlebars. If, for example, the rider needs to turn left in a half mile, the processor on the bike can receive the directions and prepare a signal for the haptic feedback unit in the left handle of the handle bars to vibrate. If the rider needed to turn right, the right handle bar could vibrate. If the driver needed to stay straight, both handles could vibrate. As the rider approaches a turn, the signals (i.e., the left and right components) change, such that the haptic outputs increase in amplitude, duration, and/or frequency.

Because the motorcycle has vibrations caused by the motor and movement, the system can calculate needed amplitude, duration, and/or frequency to ensure that the user will feel the output. For example, the system can detect the motorcycle's regular vibration pattern, then produce haptic output strong enough to be felt over the regular vibration, where the additional vibration (over the regular vibration) has a distinct amplitude, frequency, duration, etc.

The systems disclosed herein can be used for motorcycle and bicycle riders to obtain directions, glasses for the blind, gloves on skiers/snowboarders, watches, earrings, earphones (for when users don't wish to interrupt music and/or phone conversations), hearing aides, and/or steering wheels in automobiles. The systems disclosed herein can also work between a smartphone and a smartwatch. For example, consider a user who has a smartphone in their right pocket and a smartwatch on their left wrist. As the phone receives directions, when the user needs to turn right the phone (in the right pocket) can vibrate, while the smartwatch (on the left wrist) can vibrate when the user needs to turn left. The same concept can be applied to phone/smartwatch combinations which are both on a single side of the body, with the user determining which of the smartwatch and phone indicate left turns and right turns.

In various configurations, the haptic outputs can work in conjunction with visual and/or audible directions. In such configurations, the user may hear audible directions in addition to receiving haptic directions, and similarly the user may look at a map/list of directions in addition to receiving haptic directions. For example, if a user is driving an automobile and has directions being delivered audibly via a smartphone or other GPS device, the steering wheel of the automobile can provide haptic outputs in conjunction with the audible directions. However, should the user desire to mute the audible directions, the haptic directions can still be provided to the user as disclosed herein.

DETAILED DESCRIPTION

A system, method and computer-readable media are disclosed which provide haptic directions to a user. As used herein, haptic output, haptic feedback, and/or tacticle feedback recreates touch sensations by applying force, vibration, shocks, and/or motions to the user. Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts is disclosed herein. A more detailed description of providing directions via haptics will then follow, with variations and examples provided. These variations shall be described herein as the various embodiments are set forth. The disclosure now turns to FIG. 1.

Figure 1:
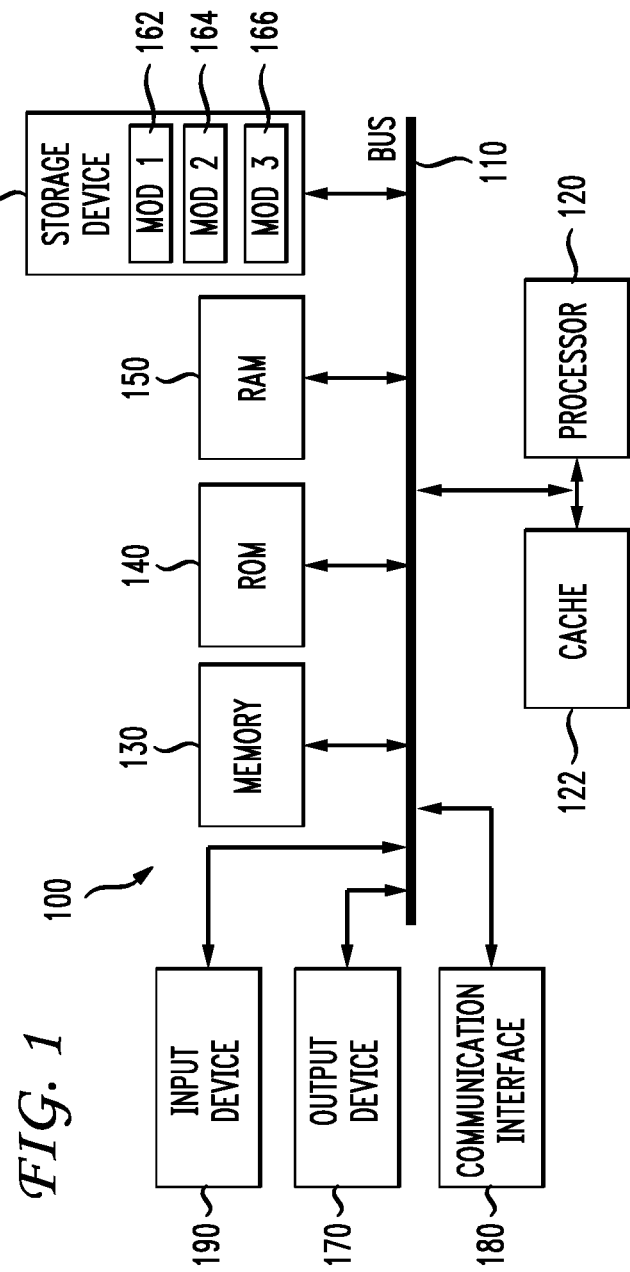
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
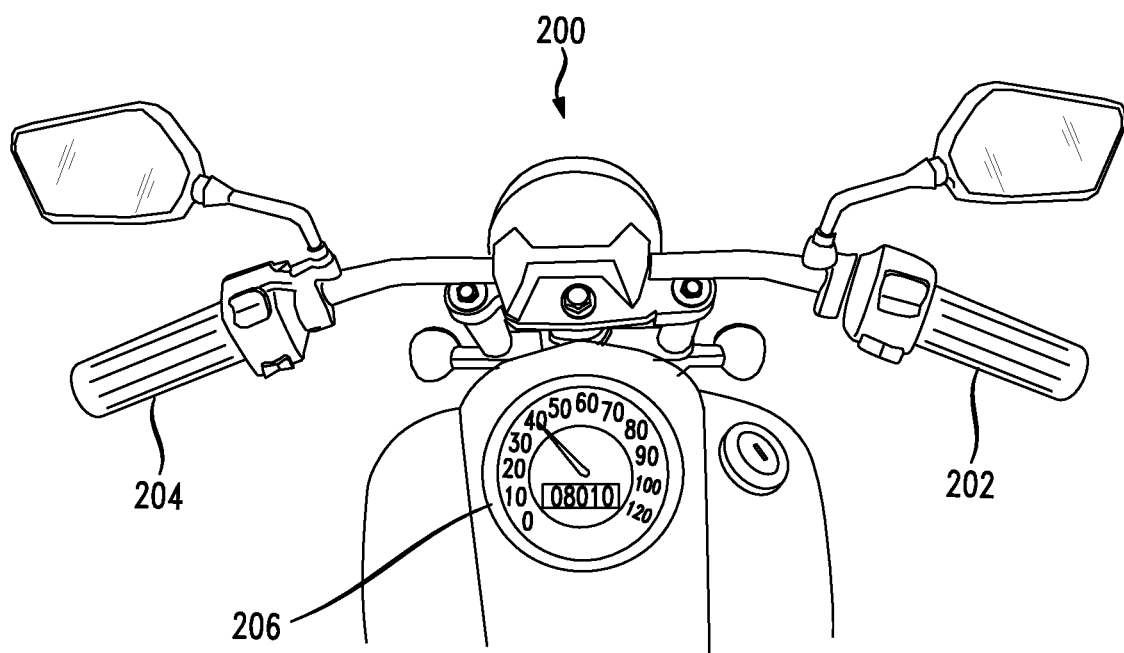
FIG. 2 illustrates an example motorcycle configuration.

Having disclosed some components of a computing system, the disclosure now turns to FIG. 2, which illustrates an example motorcycle configuration. As illustrated, the motorcycle 206 can have a haptic feedback unit in the left handle 204 and the right handle 202. These haptic feedback units/generation units can indicate to a rider how soon the rider needs to perform movement actions such as turning, going straight, performing a u-turn, etc.

The haptic units in each handle 202, 204 can receive the directions in various ways. For example, the motorcycle 206 can work in conjunction with a smartphone, GPS, or other device which can receive, generate, and/or process directions. As the smartphone determines (via any application or program) that driving instructions need to be communicated to the rider, the phone can the communicate directions to the motorcycle using a wired connection or a wireless connection such as Bluetooth or RF. In other configurations, the motorcycle itself can also receive, generate, and/or process the directions. In yet other configurations, the directions can be generated and/or processed by a combination of a wireless device (such as a smartphone or GPS) and the motorcycle.

Once the motorcycle 206 has the directions, signal components for the left haptic unit and the right haptic unit are generated by a central computer, processor, or the smartphone. Signal components can be the portions of the directions needed for each haptic unit. For example, if the directions indicate to turn left, only the left haptic unit located in the left handle bar 202 may require input. Likewise, if the directions indicate to turn right, only the right haptic unit may require input. If the directions indicate to perform a u-turn, or continue straight, both the left and right haptic units may require input. The signal inputs received by the left and/or right haptic units are referred to as the left and right signal components.

The motorcycle, or the individual haptic units, can detect the regular vibration of the motorcycle and compute the level of haptic output needed to both overcome the regular vibration and inform the rider of the upcoming movement action (i.e., turn left, turn right, perform a u-turn, continue straight). The level of haptic output needed to overcome the regular vibration can be based on historical data and/or user preferences stored within the system/motorcycle, the GPS unit (or smartphone), and/or a database networked to the system/motorcycle, as well as vibrations currently being produced by the motor.

Consider the following examples. In a first example, the motorcycle has a relative vibration level, and the past three times the system has attempted to notify the rider of upcoming turns, the rider has missed the turns. Based on a number of missed turns being exceeded (i.e., a threshold of three missed turns), the system raises the amplitude of the haptic output to be applied in subsequent notifications of directions to the user. The original amplitude, as well as the new (raised) amplitude, can be fixed or can vary based on the current vibration of the motorcycle. If the amplitude of haptic output varies dynamically based on current vibrations of the motorcycle, a lower motor vibration from the motorcycle may result in lower amplitude and/or lower frequency haptic output, whereas a higher motor vibration may result in a higher amplitude and/or higher frequency haptic output.

In a second example, the rider has user preferences defined in their smartphone for a frequency of haptic output. For example, Jim might prefer a burst of 5 vibrations to indicate a turn in 100 meters, whereas Ken might prefer a burst of 10 vibrations to indicate the same turn. The system, in converting the signal components to haptic output, identifies the stored frequency preferences of the user and produces the haptic outputs in accordance with the user preferences. In a third example, the data of many riders is analyzed to determine the frequencies, amplitudes, etc., which best ensure riders will notice haptic outputs. The system receives this data from a network server, then uses the data to generate the haptic outputs. Use of the aggregated data of many users can also be done in conjunction with the individual rider's personal preferences and/or historical data of the individual rider. As the rider continues using the system, information associated with the rider (motorcycle vibration, haptic outputs, user preferences, number of followed directions, number of missed directions, ratio of followed directions to missed, type of direction) can be uploaded to a server for (1) storage and/or (2) aggregation with similar information from other riders.

Figure 3:
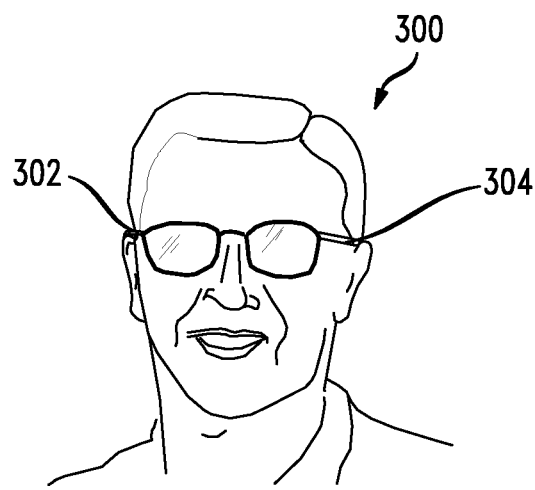
FIG. 3 illustrates an example glasses configuration.

FIG. 3 illustrates a pair of glasses 300 configured to provide haptic feedback to the wearer in a manner similar to that of the motorcycle in FIG. 2, where the haptic output units which generate the haptic output are located in the glasses. As illustrated, the haptic output units are located in the temples (aka "arms") 302, 304 of the glasses, but could also or alternatively located in the nose pads, eye wires (which hold the actual glass), the end wires which connect the temples to the eye wires, the temple tips, or any other portion of glasses. As in FIG. 2 (and in all embodiments disclosed herein), the glasses can work in conjunction with a smartphone, smartwatch, or other GPS enabled device to obtain directions, or can obtain the directions directly themselves.

Users following directions wearing the illustrated glasses 300 can be notified by a haptic output as various movement actions are approaching. For example, as the user approaches a turn, the right arm 302 of the user's glasses may vibrate. As the user is getting close to their final destination, a specified vibration sequence can occur. As an alternative to vibrations, the glasses 300 can be configured to put increase pressure from the glasses arms 302, 304 on the user's head. For example, the right arm 302 of the glasses may squeeze in slightly, notifying the user of an upcoming action.

Figure 4:
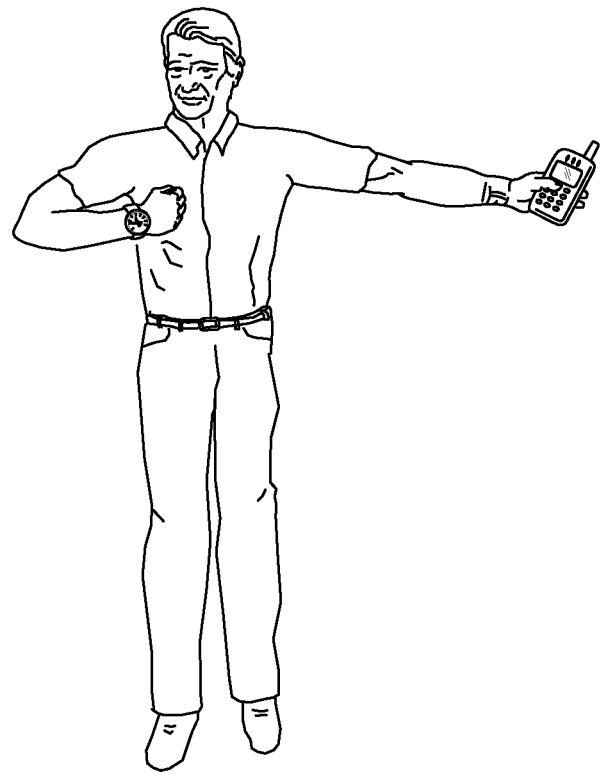
FIG. 4 illustrates an example of a smartphone/smartwatch configuration.

FIG. 4 illustrates an example of a smartphone/smartwatch configuration. In this illustration, a man wearing a smartwatch on his right wrist and carrying a phone in his left hand. As the man walks down the street, the phone and/or smartwatch can determine directions the man needs to take to arrive at his destination. If, for example, the man needs to turn left at the next corner, the phone may vibrate once a hundred feet out, three times at fifty feet out, and continue vibrating from ten feet out through the turn. Likewise, the smartwatch can begin vibrating in a similar fashion as the user approaches a right turn. If the user needs to continue walking straight, or make a u-turn, both the smartwatch and the phone can vibrate simultaneously.

The phone and the smartwatch can communicate with one another via Bluetooth, short-wave RF, or other wireless communication means. Such communication can be required when only one or the other is receiving the directions. For example, if the phone has a wireless plan and the smartwatch does not, the phone can receive the directions from an external server, then communicate the portion of the directions (i.e., the signal component) corresponding to the smartwatch wirelessly. Similarly, if the phone were a different device, such as a tablet, reading device, wireless clothing (glasses, jacket, etc), the smartwatch can be configured to receive the directions and communicate the signal components to the tablet/reading device.

Figure 5:
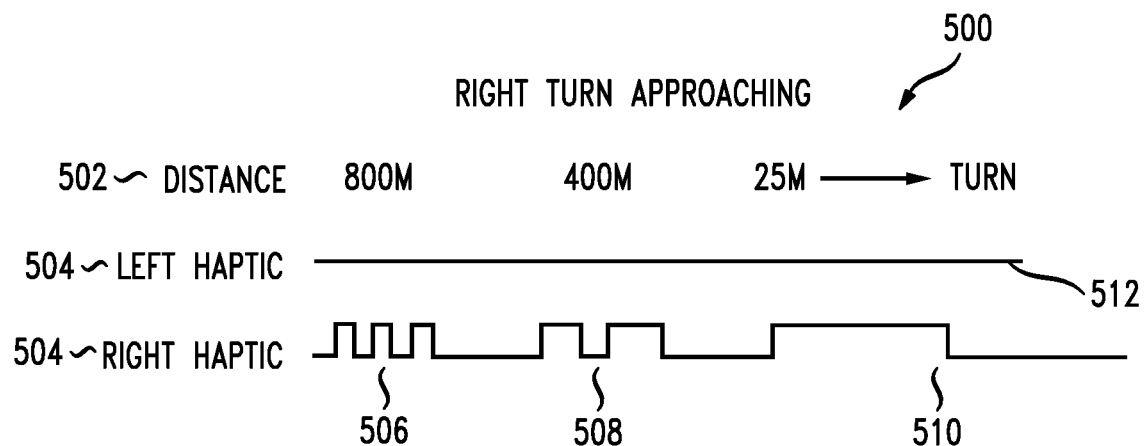
FIG. 5 illustrates a first example of haptic outputs approaching a turn.

FIG. 5 illustrates a first example 500 of haptic outputs approaching a turn. In this example, haptic outputs 504 are only produced by the haptic unit corresponding to the direction of the next turn as the distance 502 to the turn decreases—resulting in the left haptic unit not producing any haptic output 512 and the right haptic unit producing haptic output 506, 508, 510. The haptic output produced can come in multiple waves. As illustrated, the right haptic unit first produces (when the user is 800 meters away from the turn) a burst of three short pulses 506. When the distance decreases (for example, to 400 meters), a second burst of two longer pulses 508 are produced. When the turn is more immediate (for example, within 25 meters) the haptic unit can produce a single, long pulse 510 which extends through the turn. Alterative configurations can define the number of pulses (a pulse being a single haptic output of a given duration) within a burst of haptic outputs (pulses within a timeframe) for any given distance, the distance between bursts, the amplitude of bursts and/or pulses, the frequency of pulses within a burst, the type of pulse/burst, or any other factors. Such configurations can be defined by user preferences, based on aggregated data of many users, and/or a pre-determined configuration.

For example, a user can configure the haptic output 504 of the right haptic unit to both decrease the pulse frequency (as illustrated, going from three pulses in a burst to a single pulse) and increase the amplitude of each pulse in a burst-by-burst basis. In such an example, the pulses of the second burst 508 would have higher amplitude than the pulses of the first burst 506, and the pulse of the third burst 510 would be even higher.

The user could alternatively designate that the haptic output should not burst or pulse, but should instead be constantly escalating or decreasing as turns approach. Yet another alternative is for a single long pulse (such as 510) to occur at the beginning of the haptic directions (i.e., replacing the initial burst 506), with frequent pulses (such as 506) to occur as the turn approaches (i.e., replacing the final long pulse 510). In other words, users can configure the directions to occur in an opposite and/or different pattern than that illustrated according to preference.

Figure 6:
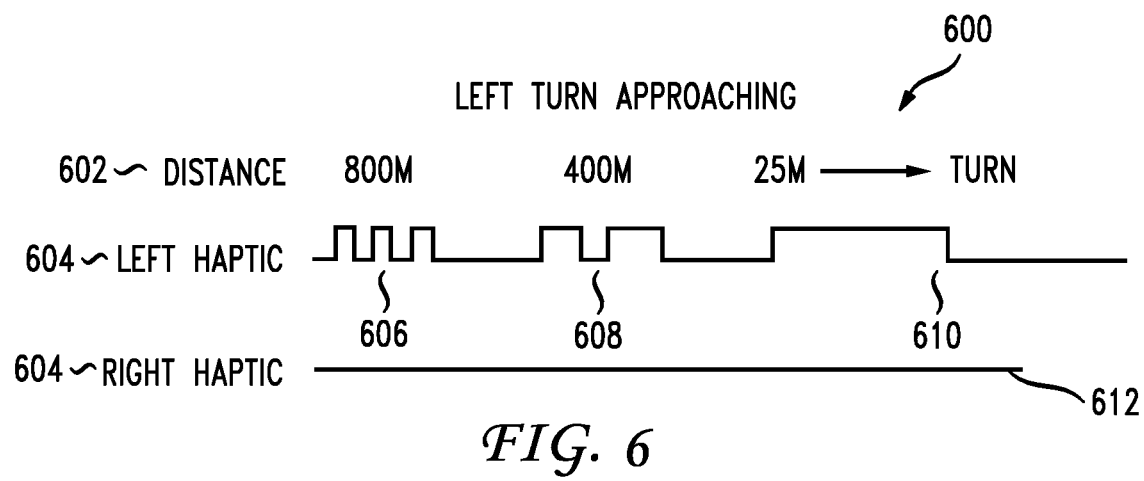
FIG. 6 illustrates a second example of haptic outputs approaching a turn.

FIG. 6 illustrates a second example 600 of haptic outputs approaching a turn. In this example, haptic outputs 604 are only produced by the haptic unit corresponding to the direction of the next turn as the distance 602 to the turn decreases—resulting in the right haptic unit not producing any haptic output 612 and the left haptic unit producing haptic output 606, 608, 610. The haptic output produced can come in multiple waves. As illustrated, the left haptic unit first produces (when the user is 800 meters away from the turn) a burst of three short pulses 606. When the distance decreases (for example, to 400 meters), a second burst of two longer pulses 608 are produced. When the turn is more immediate (for example, within 25 meters) the haptic unit can produce a single, long pulse 610 which extends through the turn. Alterative configurations can define the number of pulses within a burst for any given distance, the distance between bursts, the amplitude of bursts and/or pulses, the frequency of pulses within a burst, the type of pulse/burst, or any other factors. Such configurations can be defined by user preferences, based on aggregated data of many users, and/or a pre-determined configuration.

Figure 7A:
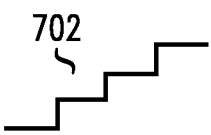
FIG. 7a illustrates haptic output increasing in a stair-like fashion.

FIGS. 7(A)-7(E) illustrate various configurations of the pulses and bursts discussed in FIG. 5 and FIG. 6. FIG. 7a illustrates haptic output increasing in a stair-like fashion 702. As illustrated, the amplitude of a pulse and/or successive pulses can be increasing at designated times (or distances) as a turn approaches. For example, as a driver approaches a turn, each successive set of pulses can be stronger (or faster) than the previous. Thus 500 meters from a turn the amplitude of the pulse could be at a base level, 200 meters from the turn the amplitude could be twice as strong as the base level, and from 50 meters through the turn the amplitude could be three times as strong as the base level. Likewise, if the frequency of the pulses is increasing as the driver approaches a turn, the frequency of pulses can increase in set amounts based on pre-defined (designated) distances from the turn.

The "step" pattern illustrated can be particularly useful in configurations where the haptic output is constant as a user approaches the turn, rather than starting and stopping. For example, at a first point a haptic unit can begin outputting haptic output at a first amplitude, with the vibrations (or other output) being continuously output at that first amplitude until reaching a second point, where the haptic output continues to be output at a higher (second) amplitude. This constant output with varying frequency and/or amplitude can then continue through the turn.

Figure 7B:
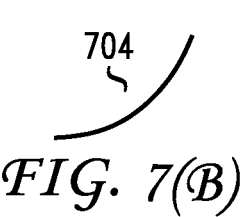
FIG. 7b illustrates haptic output increasing in an exponential fashion.

In FIG. 7b, the haptic output is increasing geometrically and/or exponentially as a user is approaching a turn. The upper limit can be based on user preferences, user history, aggregated data from other users, and/or by haptic unit capabilities.

Figure 7C:
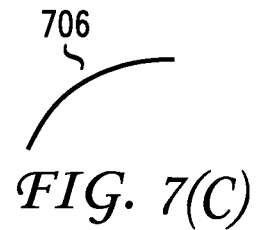
FIG. 7c illustrates haptic output having an upper limit.

In FIG. 7c, haptic output having an upper limit is illustrated. The haptic output quickly increases, then levels off as a user approaches a turn. Such configuration can be of use to users who respond well when reminded of a turn before the need to turn becomes immediate.

Figure 7D:
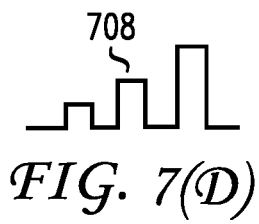
FIG. 7d illustrates haptic output periodically increasing in amplitude.

FIG. 7d, like FIG. 7a, illustrates haptic output periodically increasing in amplitude. However, as illustrated in FIG. 7d, the amplitude and/or frequency drops between pulses (or sets of pulses), such that each subsequent reminder of a turn feels slightly different to the user because of the increased amplitude/frequency.

Figure 7E:
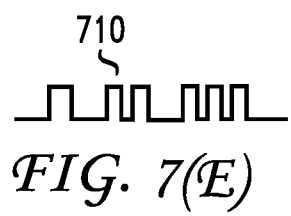
FIG. 7e illustrates haptic output periodically increasing in frequency.

FIG. 7e illustrates an example of haptic output periodically increasing in frequency and decreasing the duration of individual pulses over time. Thus a first reminder can be a single long pulse, a second reminder can be two medium pulses, and the final reminder can be three short pulses. The illustrated amplitude/frequency variations illustrated in FIG. 7a-7e can be combined as desired.

The amplitudes/frequencies, as well as their relative increases, can be user defined or can be determined by a computing device performing the processes described herein. Such determinations can be based on user history/behavior and/or the behavior of others. For example, user responses to notifications can be recorded and analyzed by the system to determine at what distance and/or time from a turn is best for a particular user. As another example, the system can consider the actions of many individuals in determining when, and at what amplitude, a haptic output notification should be delivered to a user. The people being considered could be all users who are utilizing the system, friends of the user, family of the user, etc.

In addition, such notifications can be specific to location and based on local conditions. For example, the system can record when haptic output was provided to users for a specific turn, coupled with information regarding if the users missed and/or made the turn. From an analysis of that data the system can determine the distance most likely to result in the user making that specific turn for use in preparing haptic outputs. Such data can be further augmented with information about weather conditions, time of day, other users in the vehicle, demographics of the user, language of the user, age of the user, and/or data about all turns (rather than just that specific turn). Non-user-specific data (i.e., weather, time of day) can be collected using any data collection mechanism available, such as Internet data or manual entries by users. User specific data can be provided by the user or gleaned from user interactions and behavior.

Figure 8:
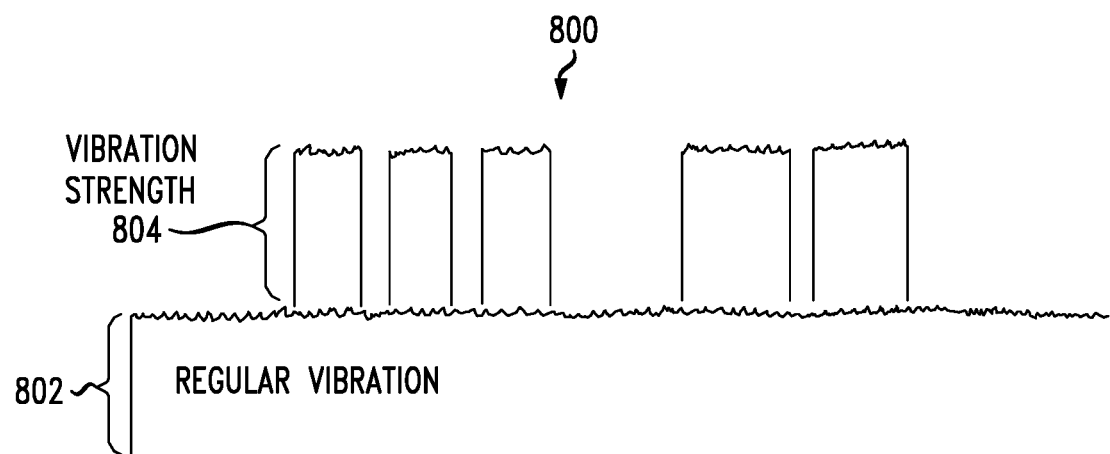
FIG. 8 illustrates calculation of required vibration strength over detected vibrations.

FIG. 8 illustrates calculation of required vibration strength over detected vibrations. Consider the example of a motorcycle. The motorcycle engine is creating a baseline/regular vibration 802. In order to generate haptic output which the user/rider will feel, the system needs to generate haptic output distinct from the regular vibration. In this case, the system generates haptic output 804 having a vibration strength roughly twice as strong as the constant/regular vibrations of the motorcycle. The same principle can be applied to other haptic output configurations. For example, if a user is driving an automobile and the haptic outputs are being delivered through the steering wheel or the seat, the system can determine the standard vibration of the vehicle and generate haptic output which overcomes the standard vibrations such that the user will feel the haptic output generated. If the user is walking down the street, the system can detect the cadence and rhythm of the user and generate haptic output having an amplitude and/or frequency based on the detected gait of the user.

The calculation of vibration strength, frequency, duration, or other haptic output features necessary to overcome ambient haptics (such as vehicle vibration) can be performed either periodically or constantly. For example, if being performed constantly, the haptic output amplitude 804 required for the user to feel the haptic output could be adjusted from a high amplitude to a low amplitude as the user slows down a vehicle (and the vehicle vibrations are reduced). Likewise, the amplitude required could increase as the user speeds up, turns onto a rough road, or otherwise increases baseline vibrations 802. Calculations can also be tied directly to speed changes in the vehicle. For example, if the motorcycle is stopped, few vibration changes will be occurring. Likewise, if the motorcycle is traveling at a constant sixty miles/hour, relatively few changes in baseline vibration will be occurring. However, during a period of acceleration, changes in vibration may necessitate more measurements. These additional measurements can help ensure that the eventual consistent vibration (during a stop or during a cruising period) are accurate.

Figure 9:
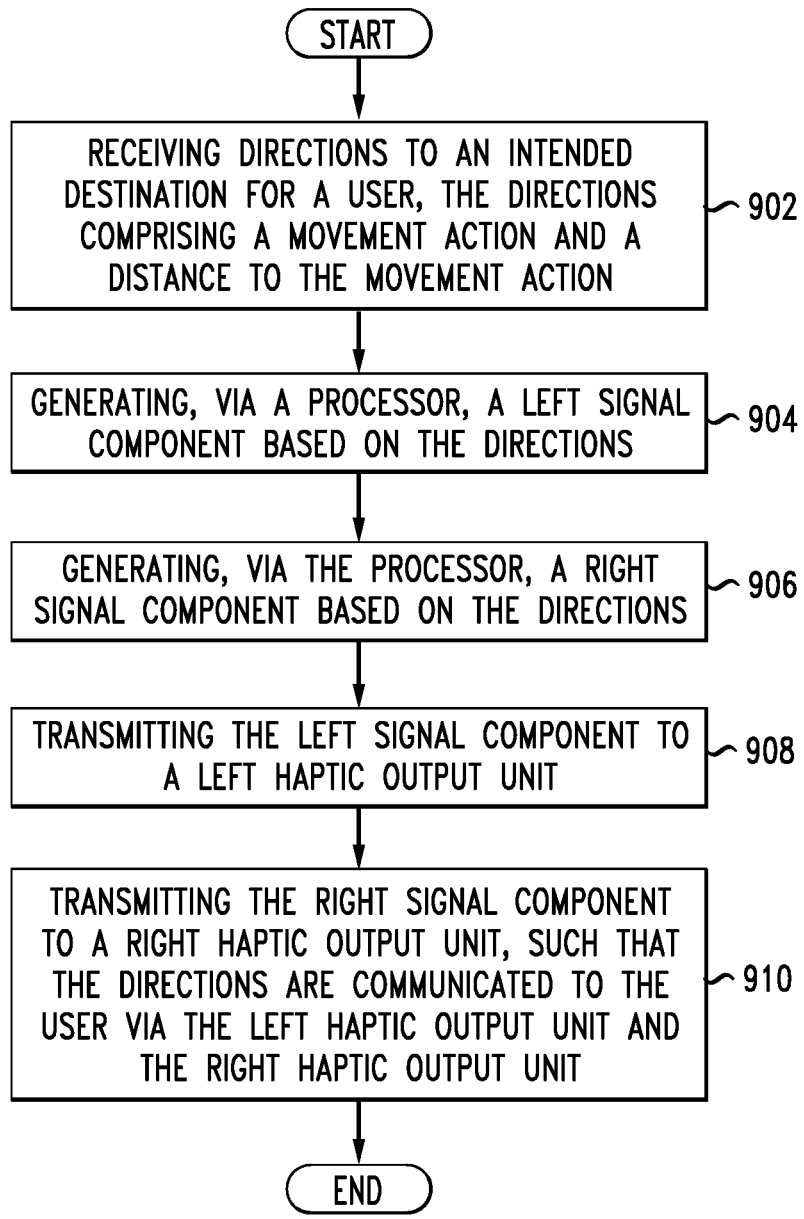
FIG. 9 illustrates a first example method embodiment.
Figure 10:
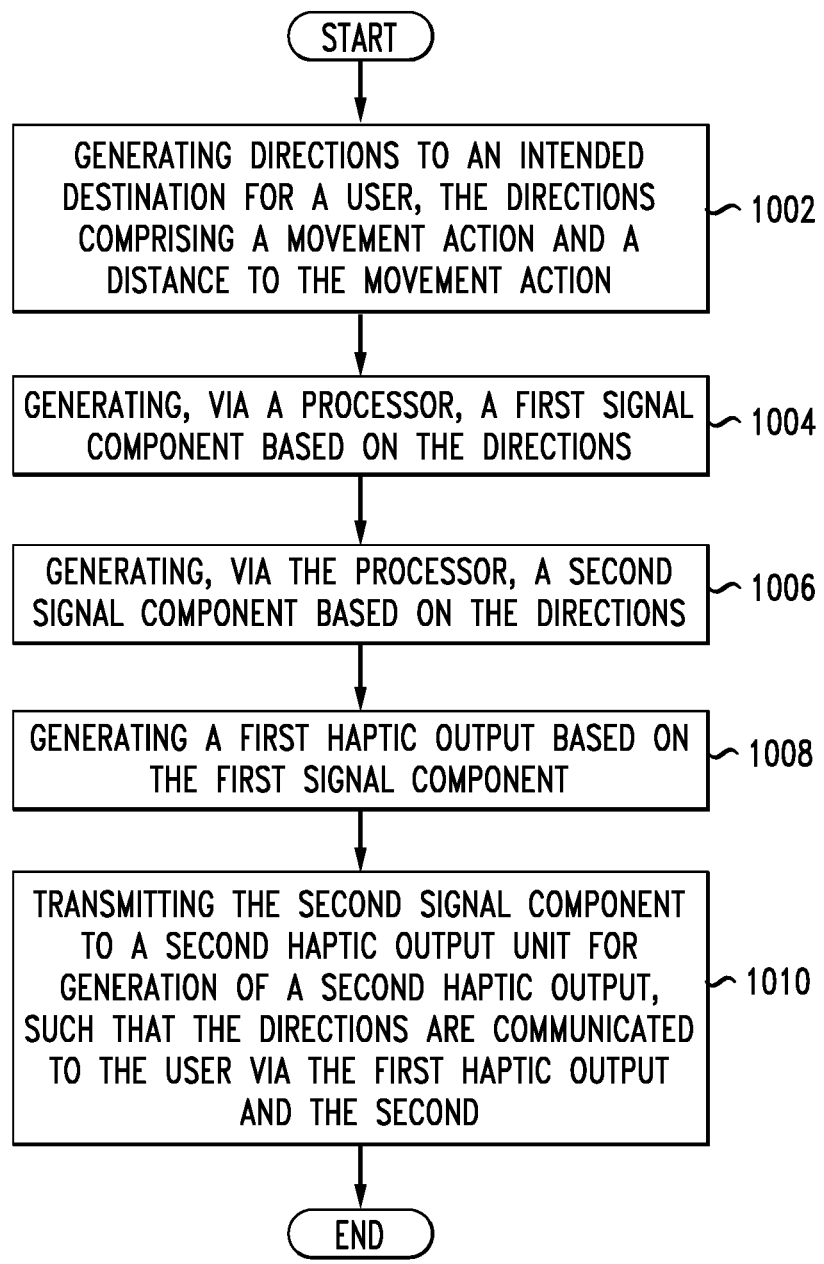
FIG. 10 illustrates a second example method embodiment.
Figure 11:
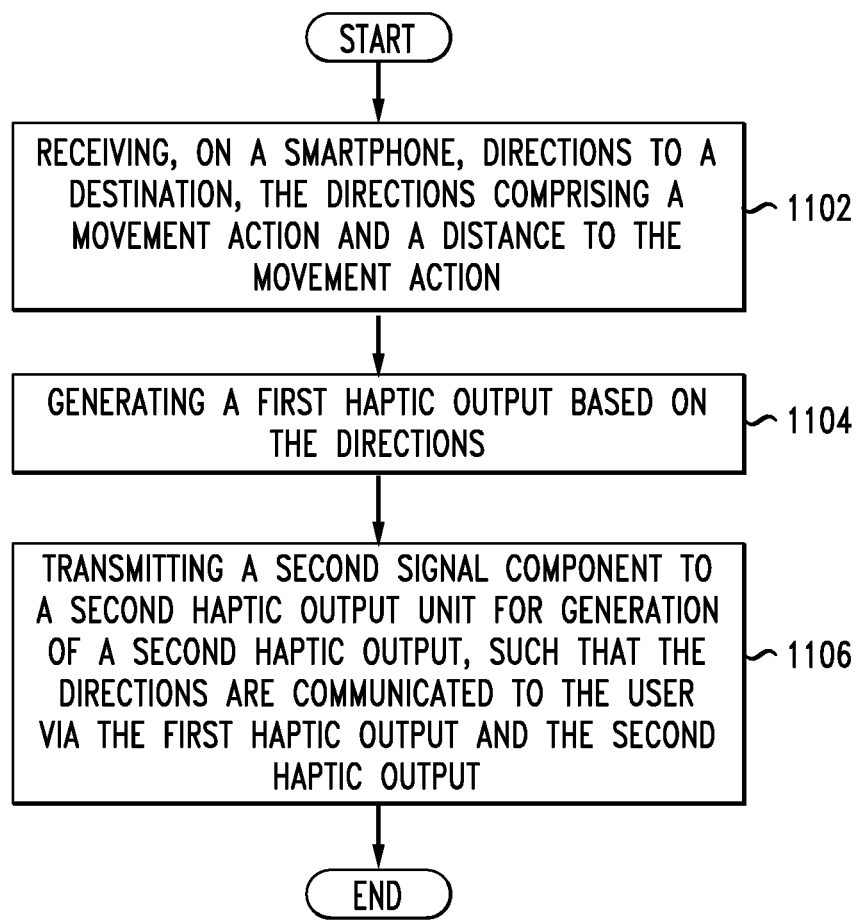
FIG. 11 illustrates a third example method embodiment.

Having disclosed some basic system components and concepts, the disclosure now turns to the exemplary method embodiments shown in FIGS. 9-11. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

In the first exemplary method embodiment illustrated in FIG. 9, a system 100 configured according to this disclosure receives directions to an intended destination for a user, the directions comprising a movement action and a distance to the movement action (902). Exemplary movement actions include "continue straight," "turn left," "turn right," "slight left," "take the second exit from the traffic circle," etc. An example of directions received by the system 100 is "turn left in a quarter mile." The system 100 generates, via a processor, a left signal component based on the directions (904) and also generates, via the processor, a right signal component based on the directions (906). The system 100 transmits the left signal component to a left haptic output unit (908) and transmits the right signal component to a right haptic output unit, such that the directions are communicated to the user via the left haptic output unit and the right haptic output unit (910).

In a second exemplary method embodiment, illustrated in FIG. 10, the system 100 generates directions to an intended destination for a user, the directions comprising a movement action and a distance to the movement action (1002). The system 100 generates, via a processor, a first signal component based on the directions (1004) and generates, via the processor, a second signal component based on the directions (1006). The system 100 generates a first haptic output based on the first signal component (1008), and transmits the second signal component to a second haptic output unit for generation of a second haptic output, such that the directions are communicated to the user via the first haptic output and the second haptic output (1010). This exemplary method could be used, for example, where the system 100 is a smartphone which contains a first haptic output unit and the user is using a smartwatch as a second haptic output unit.

In a third exemplary method embodiment, illustrated in FIG. 11, the system receives, on a smartphone, directions to a destination, the destination comprising a movement action and a distance to the movement action (1102). The system 100 generates a first haptic output based on the directions (1104) and transmits a second signal component to a second haptic output unit for generation of a second haptic output, such that the directions are communicated to the user via the first haptic output and the second haptic output (1106). This exemplary method could be used, for example, where the system 100 is a smartphone which contains a first haptic output unit and the user is using a smartwatch as a second haptic output unit.

We next turn to some practical examples of how the principles and concepts disclosed herein can be applied to specific circumstances. While specific examples are provided, it is noted that these concepts can be mixed and matched, such that components described in one embodiment can be used with other embodiments.

A first example is the use of haptic feedback as disclosed herein in applications with handle bars, such as bicycles, motorcycles, tricycles, ATVs (All Terrain Vehicles), etc.

A next example is the use of haptic feedback in a steering wheel, specifically with automobiles. In such configurations there can be haptic output units on each side of the steering wheel—one for each hand.

A next example is the use of haptic feedback for eye glasses. In such configurations the haptic output units could be on each arm of the eye glasses.

A next example is the use of haptic feedback in jewelry, such as rings, ear rings, bracelets, necklaces, and earphones. For example, if an individual were wearing a ring on each hand, the left ring could produce haptic output when the individual needs to turn left and the right ring can produce haptic output when the individual needs to turn right. A necklace could have haptic output units on two separate, non-contiguous, portions to similarly indicate left and right turns. Haptic ear rings could similarly indicate directions to the user. Haptic earphones could be used by users who don't wish to interrupt play of music while receiving directions.

A next example is the use of haptic feedback in a backpack, a hat, shoes, helmet, or other wearable object (including clothing, such as jeans, jackets, and shirts). With a backpack, the haptic output units could be in the shoulder straps, whereas in shoes each shoe could contain a separate haptic output unit. Gloves can similarly have a haptic output unit in each glove. In a hat or helmet, each side of the hat, or each side of the brim, could contain a haptic output unit.

A next example is the use of haptic feedback in seats, such as car seats (as in a driver seat, not a seat for holding small children), motorcycle seats, bicycle seats, etc. In such configurations, each side of the seat could have a separate haptic output unit.

A next example is the user of haptic feedback in canes used by the blind, or in walkers for the elderly.

Haptic outputs can include vibrations, shocks, temperature (heat, cold), raised surfaces (such as ridges, bumps, pressure, or sensations of ridges, bumps, etc.). While many of the examples disclosed herein use multiple haptic outputs to communicate directions to a user (such as haptic signals on a left handle indicating to turn left and haptic signals on a right handle indicating to turn right), configurations using only a single haptic output are also possible. For example, if an individual is blind and using a walking cane configured as disclosed herein, a first pattern of haptic signals could indicate the user should turn right and a second pattern of haptic signals could indicate to the user they should turn left. A third pattern could indicate the need to perform a U-turn. That is, the directions could be provided using a single haptic output unit (provided by a single smartphone, a single smartwatch, a key-chain dongle, a walking cane, etc.) to provide the directions using distinct patterns of haptic output rather than haptic output from multiple haptic output generating units.

Likewise, systems which use more than two haptic outputs are likewise within the scope of this disclosure. For example, a system could utilize a combination of a smartphone, a smartwatch, and sunglasses to communicate directions to the user. If, for example, the smartwatch were on the user's left arm, the smartphone were in the user's left pocket, and the user were wearing the sunglasses, one possible configuration could be the smartphone and the smartwatch vibrating (i.e., providing haptic output) simultaneously to indicate left turns, while both arms of the sunglasses vibrate simultaneously to indicate a right turn. Alternatively, haptic output from the smartphone might indicate a right turn despite being in the left pocket, haptic output from the smartwatch might indicate a left turn, and haptic output on the respective arms of the sunglasses is configured to be output simultaneously with the corresponding left and right haptic outputs of the smartphone and smartwatch. In yet another alternative, the sunglasses might be configured to only provide haptic output when a U-turn is required.

Systems configured as disclosed herein can provide directions from any available resource. Practically, most directions will be provided through smartphone applications, such as Apple Maps™ or Google Maps™. However, directions can also be provided to follow custom user paths or maps. In one example, a runner charts out a running path on their phone or computer before setting out. As the runner proceeds, directions are given to the user through rings, phones, watches, gloves, sunglasses, etc., enabling the runner to stay on the path they mapped out without needing to reference a map or their phone. In another example, several skiers wish to compete in an unofficial competition. A first skier marks a path, and subsequent skiers seek to obtain faster times by following the first skier's path using haptic output directions to know where to go and when to turn. In other words, users can race one another over the same course without needing to be physically together and without needing to constantly review or memorize the course/directions.

The haptic output devices, such as smartphones, smartwatches, etc., can communicate via wired or wireless communications. Exemplary wireless communicates can include Bluetooth, short range RF, infrared, or any other wireless communication mechanism.

Users can set their preferences for how they wish to receive haptic output or the haptic output can be configured according to set parameters. One configuration allows for the haptic output to be based on patterns of the user and/or others, including friends, family, others of similar demographics and/or socio-economic status. The specific patterns provided (for example, how a u-turn, or the need to continue straight, is haptically communicated) can, if desired, be set by the user, as can the amplitudes, frequencies, durations, pauses, patterns, etc. In addition, the system can be configured to identify the strength of pre-existing vibrations or signals and calculate how to ensure the user will feel the haptic output provided. The system can record user actions based on directions provided and make adjustments based on that data. Likewise, the recorded data can be used to adjust haptic output provided to other users based on a current user's behavior, similarity of the user with other users, and/or common location.

Systems configured according to this disclosure can be configured to experiment to find haptic outputs which do and do not work. For example, if a certain highway exit is always missed by a wide variety of users, the haptic output might be significantly increased, provided earlier, etc., as the system (in this case a server compiling information related to directions provided and taken) identifies what haptic outputs result in directions being correctly followed and what haptic outputs do not result in followed directions. The system can record this information, then determine which variables affect the outcome. Specifically, the system can record user information such as age, gender, identified preferences, amplitude/duration/frequency of haptic outputs, how long before the turn, and whether the haptic output resulted in a correct turn (or otherwise following the directions provided). All of this information can be placed in a table and regression analyses can be performed on the data to identify which variables affect the outcome. In some cases, the analysis can be based only on the data acquired in a most recent timeframe (i.e., the past week), whereas in other cases the analysis can be based on all data recorded with respect to a specific user, location, and/or circumstances (i.e., on Saturday afternoons when it is snowing). The system can automatically adjust haptic output based on the findings of such analyses, or can provide a suggestion to a user, such as "95% of all users don't respond unless vibrations are stronger than you've currently set. Would you like to increase your current settings?"

Systems configured according to this disclosure can utilize phones, tablets, smartwatches, and/or other devices to provide directions. These directions can come across network connections or can be based on stored map and location information found on the device and/or apparatus itself. Thus, possible hardware configurations can be (but are not limited to):

(1) Network—Network Accessible Device (i.e., phone)—Apparatus (i.e., motorcycle)—Haptic Outputs (i.e., vibration devices in the handlebars)
(2) Network—Network Accessible Device (i.e., phone)—Haptic Outputs (i.e., vibration devices in the handlebars)
(3) Device (i.e., phone)—Apparatus (i.e., motorcycle)—Haptic Outputs (i.e., vibration devices in the handlebars)
(4) Device (i.e., phone)—Haptic Outputs (i.e., vibration devices in the handlebars)
(5) Apparatus (i.e., motorcycle)—Haptic Outputs (i.e., vibration devices in the handlebars)
(6) Network—Network Accessible Apparatus (i.e., car or motorcycle)—Haptic Outputs (i.e., vibration devices in the handlebars)
(7) Network—Haptic Outputs (where the haptic devices themselves are connected to the network)

In a final example, systems configured according to this disclosure can provide haptic output specific to a current activity, or activity level, of the user. For example, the system might be configured to always provide haptic output when the user is walking but to always provide spoken directions when the user is driving. Likewise, the system might be configured to provide haptic output if listening to music, speaking on the phone, writing a text message, playing a game, and/or otherwise distracted. One level of providing directions can be provided to a user when the user is walking versus when the user is running. Similarly, a level of directions might be provided to a user when the user is "racing" versus cruising for pleasure (in motorcycles, driving, skiing, running, etc.). Such conditions can also be recorded by the system for future analysis, as discussed above.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to providing directions using haptic feedback in a wide variety of circumstances, and specifically to providing haptic feedback which overcomes current vibrations and tactile stimulus. Various modifications and changes may be made to the principles described herein without following the example embodiments and applications illustrated and described herein, and without departing from the spirit and scope of the disclosure.

I claim:

1. A method comprising:
providing, from a computer system to a first mobile device associated with a first user at a first time, first directions for navigating a specific location, the first directions comprising:
a first movement action; and
a first distance to the first movement action;
receiving, at the computer system from the first mobile device, data indicating that the first user failed to successfully navigate the specific location based on the first directions;
identifying, via at least one processor of the computer system based on the data, a modification to the first directions which improve a likelihood that other users will successfully navigate the specific location, resulting in second directions for navigating the specific location, the second directions comprising:
a second movement action;
a second distance to the second movement action; and
at least one distinction from the first directions; and
providing, from the computer system to a second mobile device of a second user at a second time after the first time, the second directions for navigating the specific location, the second user being distinct from the first user.

2. The method of claim 1, further comprising:
receiving, after the first time and before the second time at the computer system from at least one additional mobile device associated with at least one other user, additional data indicating how the at least one other user navigated the specific location,
wherein the identifying of the modification is further based on the additional data.

3. The method of claim 2, wherein the identifying of the modification comprises executing a regression analysis on variables associated with navigation of the specific location by the first user and the at least one other user.

4. The method of claim 2, wherein the at least one other user shares at least one of a common demographic, a common language, and a common age with the second user.

5. The method of claim 1, wherein the at least one distinction comprises a difference between the first distance and the second distance.

6. The method of claim 1, wherein the at least one distinction comprises a difference between the first movement action and the second movement action.

7. The method of claim 1, wherein:
the first directions cause at least one haptic output device associated with the first mobile device to generate first haptic output;
the second directions cause at least one haptic output device associated with the second mobile device to generate second haptic output;
the first directions further comprise respective a first amplitude of the first haptic output to be generated by the at least one haptic output device associated with the first mobile device; and
the second directions further comprise respective a second amplitude of the second haptic output to be generated by the at least one haptic output device associated with the second mobile device.

8. The method of claim 7, wherein the at least one distinction comprises a difference in the first amplitude and the second amplitude.

9. The method of claim 1, further comprising:
receiving, at the computer system, weather conditions for the specific location when the first user navigated the specific location based on the first directions,
wherein the identifying of the modification is further based on the weather conditions.

10. The method of claim 1, wherein the second directions are further personalized for the second user.

11. A system comprising:
at least one processor; and
a non-transitory computer-readable storage medium having instructions stored which, when executed by the at least one processor to perform operations comprising:
providing, to a first mobile device associated with a first user at a first time, first directions for navigating a specific location, the first directions comprising:
a first movement action; and
a first distance to the first movement action;
receiving, from the first mobile device, data indicating that the first user failed to successfully navigate the specific location based on the first directions;
identifying, based on the data, a modification to the first directions which improve a likelihood that other users will successfully navigate the specific location, resulting in second directions for navigating the specific location, the second directions comprising:
a second movement action;
a second distance to the second movement action; and
at least one distinction from the first directions; and
providing, to a second mobile device of a second user at a second time after the first time, the second directions for navigating the specific location, the second user being distinct from the first user.

12. The system of claim 11, the non-transitory computer-readable storage medium having additional instructions stored which, when executed by the at least one processor, cause the at least one processor to perform operations comprising:
receiving, after the first time and before the second time from at least one additional mobile device associated with at least one other user, additional data indicating how the at least one other user navigated the specific location,
wherein the identifying of the modification is further based on the additional data.

13. The system of claim 12, wherein the identifying of the modification comprises executing a regression analysis on variables associated with navigation of the specific location by the first user and the at least one other user.

14. The system of claim 12, wherein the at least one other user shares at least one of a common demographic, a common language, and a common age with the second user.

15. The system of claim 11, wherein the at least one distinction comprises a difference between the first distance and the second distance.

16. The system of claim 11, wherein the at least one distinction comprises a difference between the first movement action and the second movement action.

17. The system of claim 11, wherein:
the first directions cause at least one haptic output device associated with the first mobile device to generate first haptic output;
the second directions cause at least one haptic output device associated with the second mobile device to generate second haptic output;

the first directions further comprise respective a first amplitude of the first haptic output to be generated by the at least one haptic output device associated with the first mobile device; and the second directions further comprise respective a second amplitude of the second haptic output to be generated by the at least one haptic output device associated with the second mobile device.

18. The system of claim 17, wherein the at least one distinction comprises a difference in the first amplitude and the second amplitude.

19. The system of claim 11, the non-transitory computer-readable storage medium having additional instructions stored which, when executed by the at least one processor, cause the at least one processor to perform operations comprising:

receiving, weather conditions for the specific location when the first user navigated the specific location based on the first directions, wherein the identifying of the modification is further based on the weather conditions.

20. A non-transitory computer-readable storage medium having instructions stored which, when executed by at least one processor to perform operations comprising:

providing, to a first mobile device associated with a first user at a first time, first directions for navigating a specific location, the first directions comprising:

a first movement action; and a first distance to the first movement action;

receiving, from the first mobile device, data indicating that the first user failed to successfully navigate the specific location based on the first directions;

identifying, based on the data, a modification to the first directions which improve a likelihood that other users will successfully navigate the specific location, resulting in second directions for navigating the specific location, the second directions comprising:

a second movement action;

a second distance to the second movement action; and at least one distinction from the first directions; and providing, to a second mobile device of a second user at a second time after the first time, the second directions for navigating the specific location, the second user being distinct from the first user.

\* \* \* \* \*